United States Patent [19]
Hentschel

[11] 3,783,686
[45] Jan. 8, 1974

[54] MAGNETIC FLOWMETER ARRANGEMENT

[75] Inventor: Rainer Hentschel, Hanover, Germany

[73] Assignee: Fischer & Porter Company, Warminster, Pa.

[22] Filed: Nov. 5, 1971

[21] Appl. No.: 196,011

[30] Foreign Application Priority Data
Nov. 6, 1970 Germany.............. P 20 54 624.1

[52] U.S. Cl. ............................ 73/194 EM
[51] Int. Cl. ................................. G01f 1/04
[58] Field of Search............... 73/194 EM, 204

[56] References Cited
UNITED STATES PATENTS
| | | | |
|---|---|---|---|
| 2,603,089 | 7/1952 | Morley et al. | 73/204 |
| 2,808,723 | 10/1957 | Buntenbach | 73/194 EM |
| 3,449,951 | 6/1969 | Westersten | 73/194 EM |

Primary Examiner—Richard C. Queisser
Assistant Examiner—Stephen A. Kreitman
Attorney—Michael Ebert

[57] ABSTRACT

A magnetic flowmeter in which a pair of metering electrodes is disposed at diametrically opposed points in a flow tube through which flows the fluid to be measured, a magnetic field being established at right angles to the direction of flow by an excitation winding. The winding is energized by a cyclical voltage derived from an a-c power line, the polarity of the cyclical voltage being reversed at a rate which is a submultiple of the line frequency whereby each interval between successive points of reversal contains the same number of full cycles and the polarity of the last half cycle in each interval is the same as the first half cycle in the succeeding interval. The arrangement is such as to cancel error voltage components resulting from line frequency disturbances.

9 Claims, 2 Drawing Figures

3,783,686

MAGNETIC FLOWMETER ARRANGEMENT

BACKGROUND OF THE INVENTION

This invention relates generally to magnetic flow meters having excitation windings, and more particularly to a controlled a-c power supply circuit for an excitation winding, said circuit being adapted to apply an alternating voltage thereto whose polarity is reversed at a rate which is a sub-multiple of the power frequency.

A magnetic flowmeter is a volumetric fluid flow rate device utilizing the characteristics of a metered fluid to produce an induced voltage when flowing through a magnetic field. The operation of the meter is based on Faraday's Law of Induction which states that the voltage induced across a conductor as it moves at right angles through a magnetic field is proportional to the velocity thereof.

In a magnetic flowmeter, the fluid to be measured is conducted through a pipe section having a pair of electrodes mounted therein at diametrically-opposed points, a magnetic field being generated by an excitation winding in a plane perpendicular to the longitudinal axis of the pipe section, which plane includes the transverse axis common to the electrodes. If one considers a segment of the metered fluid as a conductor whose length D is equal to the diameter of the pipe, then as the fluid conductor moves at a velocity V through a magnetic field B, the voltage induced across this conductor in the plane of the meter electrodes will be proportional to the rate of fluid flow.

This may be expressed mathematically by the following equation:

$$E = (1/C) BDV,$$

where C is a dimensionless constant.

By providing a magnetic field B of high strength, a favorable signal-to-noise ratio is obtainable in the output of the flowmeter. The reason for this will be evident from the foregoing equation, in that for a given fluid velocity V, an increase in the strength of the magnetic field B will give rise to an increase in the induced voltage E.

It is often the practice to energize the excitation winding directly from an alternating-current power line, for this is the most economical method of effecting excitation. With this arrangement, erroneous readings may be produced, for parasitic and tansitory ground currents which appear at random due to disturbances in the power lines may give rise to voltage drops in the flowing medium between the metering electrodes.

These voltage drops are superimposed on the actual metering voltages, as a consequence of which the signal yielded at the metering electrodes contains both a true and an error component. These components are delivered to the indicating device coupled to the meter electrodes and an inaccurate reading is obtained which fails to reflect the true value of flow velocity. In particular, in the case of extended drinking water lines, the ground currents may be such as to upset the accuracy of the associated flowmeter.

It is known to provide compensating devices in conjunction with magnetic flowmeters which are adjusted for a fixed condition to balance out error signals. However, such compensating devices are impractical in the present context, for the disturbances in question tend to vary in magnitude and to shift in phase relative to the alternating line currents, although such changes usually occur slowly with time.

SUMMARY OF THE INVENTION

In view of the foregoing, it is the main object of this invention to provide a flowmeter system wherein the excitation winding is energized by an alternating power line voltage and including means to compensate for line disturbances which change slowly with time as to magnitude and phase, whereby accurate readings of flow velocity are obtained.

Also an object of the invention is to provide simple compensation means of the above-noted type which functions reliably and efficiently.

Briefly stated, in a magnetic flowmeter according to the invention, a pair of metering electrodes are disposed at diametrically opposed positions in a tube through which flows the fluid to be measured, a magnetic field being established at right angles to the direction of flow by an excitation winding. The excitation winding is energized by a cyclical voltage derived from an a-c power line, the polarity of the cyclical voltage being reversed at a rate which is a sub-multiple of the line frequency whereby each interval between successive points of reversal contains the same number of full cycles, and the polarity of the last half cycle in each interval is the same as the first half cycle in the succeeding interval.

As a result of the cyclical voltage of reversing polarity applied to the excitation winding, the signal derived from the metering electrodes partially represents the sum of the metering voltage generated by the flowing medium and the error voltage arising from disturbances, and partially the difference between said metering and error voltages.

By using an indicator in conjunction with the metering electrodes which has a slow response time as compared to the cycle sequence between two points of polarity change, then this indicator shows a mean value of the sum and difference values whereby the error voltage is virtually eliminated. A still more accurate indication is obtainable by interposing a low pass filter between the metering electrodes and the indicator, in which event a more accurate indicator havng a fast responsive time may be used.

OUTLINE OF THE DRAWING

For a better understanding of the invention, as well as other objects and further features thereof, reference is made to the following detailed description to be read in conjunction with the accompanying drawing, in which:

FIG. 1 is a schematic diagram of a magnetic flowmeter system including compensation means in accordance with the invention; and FIG. 2 is a wave form illustrative of the operation of the excitation circuit.

DETAILED DESCRIPTION OF THE INVENTION

Figure 1:
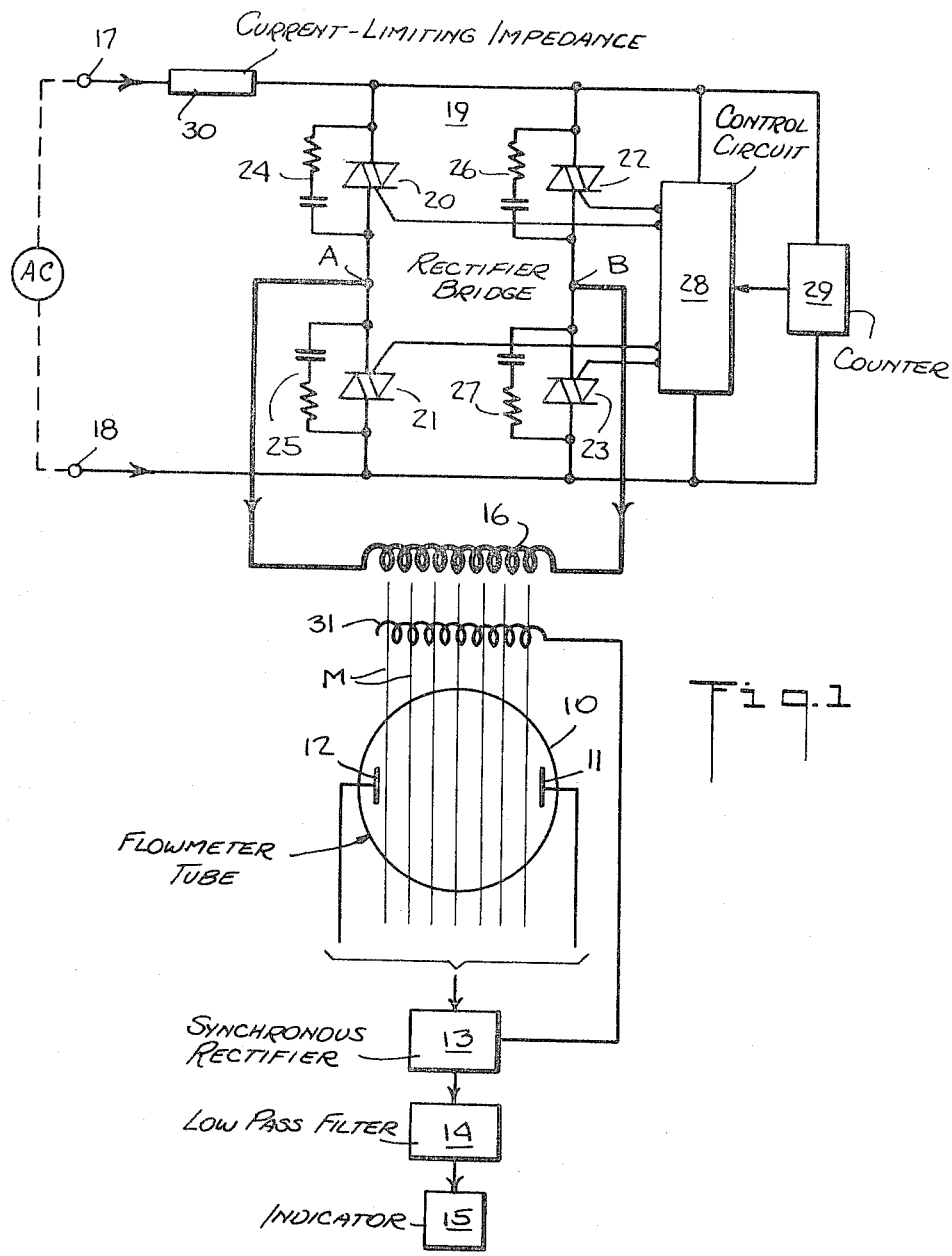

Referring now to the drawing, there is shown a magnetic flowmeter system having a compensation means in accordance with the invention, the meter including a pipe section 10 of circular cross-section, made of non-magnetic material.

Two small, disc-shaped electrodes 11 and 12 are mounted at diametrically-opposed points in the central portion of pipe section 10. The signal established between these two electrodes is applied to a synchronous rectifier 13 whose output is fed through a lowpass filter 14 to an indicator 15. In the pipe section, the fluid to be measured flows in the direction of the longitudinal axis which is perpendicular both to the transverse axis extending between and common to electrodes 11 and 12 and to the axis bisecting the pipe section in the vertical plane.

In order to crate a magnetic field normal to the flow axis, there is provided an excitation coil 16 of the type conventionally used in magnetic flowmeters. Thus, the magnetic lines of flux, which are established by the excitation coil as indicated by lines M, extend through the vertical plane at right angles to the longitudinal axis of the flow conduit.

Voltage for energizing excitation coil 16 is derived from a alternating-current power line at terminals 17 and 18, from which terminals it is applied to the input diagonals of a rectifier bridge having four identical legs. The voltage developed at the output diagonals A and B of the bridge is applied across excitation coil 16.

The four legs of the bridge are constituted by triacs 20, 21, 22 and 23, serving as rectifiers capable of conducting in both directions. Connected across these triacs are R-C networks 24, 25, 26 and 27, respectively. The triggering or firing of the triacs is carried out in a predetermined order by control circuit 28 to which the firing electrodes are connected, the triggering pulses being derived from the power line. The operation of the control circuit is governed by an electronic counter 29, also powered by the power line.

The wave form of the voltage appearing at output diagonals A and B of the bridge which is applied to the excitation winding, is determined by the sequence in which the triacs are triggered. The arrangement is such as to produce an excitation voltage whose wave form is shown in FIG. 2 wherein the train of voltage cycles representing the a-c line voltage is reversed in polarity at a periodic rate which is a sub-multiple of the line frequency.

When the pair of triacs 20 and 23 are rendered simultaneously conductive, diagonal A of the bridge is connected by triac 20 to input terminal 17, while diagonal B is connected by triac 23 to input terminal 18. But when the pair of triacs 20 and 23 are non-conductive and the pair of triacs 21 and 22 are rendered simultaneously conductive, the relationship is reversed, for then diagonal A is connected by triac 21 to input terminal 18 and diagonal B is connected by triac 22 to input terminal 17.

Figure 2:
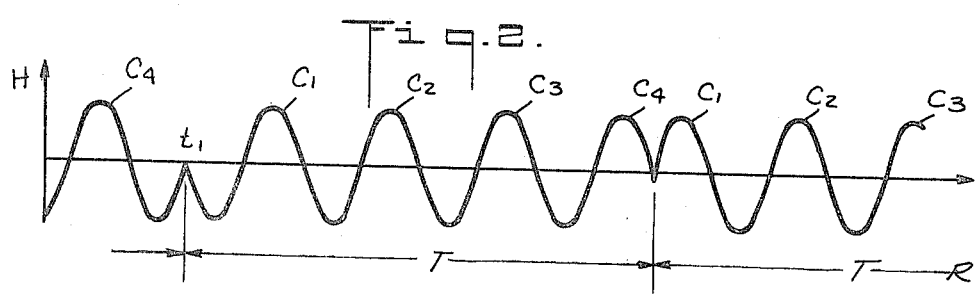

As illustrated in FIG. 2, a reversal in polarity is effected periodically at equi-spaced points in time $t_1$, $t_2$, etc. spaced apart by an interval T during which a predetermined number of full cycles of line frequency occur. Assuming for example, a line for frequency of 60 cycles per second and a polarity reversal frequency of fifteen cycles per second (60/15 = 4), then each interval T covers four full cycles of line frequency ($C_1$, $C_2$, $C_3$, $C_4$). Thus, just at the point ($t_1$, $t_2$, etc.) at which the fourth cycle $C_4$ of the line frequency goes through zero, the polarity is reversed, as a consequence of which the next half cycle of the cycle $C_4$ in the succeeding interval is of the same polarity as the last half cycle in the preceeding interval. It will be seen therefore that the last half cycle before point $t_1$ is negative and that the succeeding half cycle is also negative, whereas the last half cycle before $t_2$ is positive and the succeeding half cycle is also positive.

Thus, periodic reversal in polarity of the cyclical voltage is effected by alternately firing the triac pairs 20–23 and 21–22. This is accomplished by counter 29 which counts the cycles of line voltage, and when the count reaches the predetermined number related to interval T, the counter then actuates control circuit 28 for the triacs. When actuated, the control circuit 28 functions to fire the triac pairs alternately.

The arrangement is such that the two pairs of triacs cannot be triggered at the same time, thereby avoiding a short-circuit of the power line. A current limiting resistor 30 interposed between input terminal 17 and the bridge, acts to protect the line from short-circuit currents. Excessively rapid voltage changes as a result of commutations at the legs of the bridge, are delayed by R-C networks 24 to 27.

Since the triacs are always shut off when the current goes through zero and are thereafter immediately triggered, there is no discontinuity in the intensity H of the field strength of the magnetic field M. By reversing polarity of the excitation voltage applied to the excitation winding, the voltage taken from metering electrodes 11 and 12 will, in part, represent the sum of the voltage resulting from line frequency disturbances, and, in part, the difference between these two voltage components.

When indicator 15 is chosen to have a slow response time relative to the cycle sequence between two points of polarity change, then this indicator yields a mean value of the sum and difference values wherein the error voltage is effectively canceled out. By interposing a low-pass filter 14 between the metering electrodes and indicator 15, one may use an indicator having a more rapid response time to produce still more accurate indications.

The voltage appearing at metering electrodes 11 and 12 and containing the flow rate and the error component, is applied to synchronous rectifier 13 whose phase is governed with respect to that of the flowmeter signal by means of a control voltage derived from an auxiliary coil 31 disposed within magnetic field M. The rectifier therefore yields a direct voltage signal depending on flow velocity in which the undesired error signal is superimposed as an alternating voltage on the ground frequency $fo = 1/T$ by reason of the phase relationship of the control voltage applied to the rectifier, to that of the polarity-reversing cyclical voltage applied to the excitation coil.

The signal voltage produced by the synchronous rectifier having an error signal superimposed on a base voltage, is applied to low pass filter 14 which filters out the error signal so that indicator 15 receives only the base voltage which truly reflects flow velocity.

To summarize the essential features of the invention, it is noted that the invention is concerned with a magnetic flowmeter whose field coils are energized by cyclical voltage taken from an a-c power line. The signal developed at the metering electrodes as a result of a fluid flow intercepting the magnetic field established by the field coils, is in phase with the cyclical a-c voltage applied to the coils. The problem to which the invention is addressed is that resulting from a parasitic a-c voltage which leaks from the a-c power line and is directly established across the metering electrodes. This parasitic voltage is not a function of flow rate but is the consequence of current running down the flow pipe. In Europe, for example, currents running down the pipeline are quite common because of the way in which the power distribution is tied to earth.

Thus the a-c voltage appearing across the metering electrodes is a composite made up of an a-c signal component and an a-c parasitic or error component. This composite voltage, since it depends only in part on flow rate, when fed to an indicator gives a misleading reading of flow rate. The purpose of the invention is to get rid of the parasitic component and thereby produce a true reading. This is done by reversing the polarity of the a-c voltage applied to the field coils at a rate which is a sub-multiple of the line frequency. Thus, as shown in FIG. 2, after every four full cycles of a-c, the polarity is reversed.

Since the phase of the parasitic component appearing at the electrodes is steady and is independent of the reversing polarity of the a-c voltage applied to the field coils, the phase of the parasitic component of the voltage on the metering electrodes remains unchanged. But the signal component which is dependent on the a-c voltage applied to the field coils, reverses phase each time the field voltage is reversed in polarity. Consequently, we now have a composite signal on the metering electrodes whose signal component reverses phase every few cycles but whose parasitic component always remains in the same phase. It then becomes possible, using this distinction, to discriminate between the two components and to filter out the parasitic component and retain the desired signal component.

While there has been shown a preferred embodiment of the invention, it will be obvious that many changes may be made therein without departing from the essential spirit of the invention.

I claim:

1. In a magnetic flowmeter provided with a flow tube for conducting the fluid to be measured, a pair of metering electrodes disposed at diametrically opposed positions in said tube, and an excitation coil to establish a magnetic field in said tube at right angles to the direction of fluid flow to produce a singal which is applied to an indicator; a circuit for applying an enegizing voltage to said coil comprising,
   a. means connecting said circuit to an a-c power line to provide a cyclical voltage whose frequency corresponds to the line frequency, a parasitic voltage derived from said line being produced across said metering electrodes,
   b. means to reverse the polarity of the cyclical voltage at a rate which is a sub-multiple of the line frequency whereby each interval between successive points of reversal contains the same number of full cycles, and the polarity of the last half cycle in each interval is the same as the first half cycle in the succeeding interval, and
   c. means to apply said periodically reversed cyclical voltage to said excitation coil to produce said signal across said metering electrodes which depends on flow rate and which reverses in phase each time said cyclical voltage is reversed in polarity.

2. A circuit as set forth in claim 1, further including a low pass filter and means to apply said signal to said indicator through said filter.

3. A circuit as set forth in claim 1, wherein said means to reverse the polarity of the cyclical voltage is constituted by a rectifier bridge each of whose legs is constituted by a bi-directional rectifier, the input diagonals of said bridge being connected to said power line, the output diagonals being connected to said excitation coil, and means alternately at a rate in accordance with said sub-multiple frequency, to trigger a first pair of said legs to cause said line voltage to be applied to said coil in one direction and to trigger the second pair of legs to cause said line voltage to be applied in the reverse direction.

4. A circuit as set forth in claim 3, wherein said triggering means includes a counter which counts the cycles of the cyclical voltage, and after a predetermined number is counted, acts to effect said reversal in direction.

5. A circuit as set forth in claim 3, wherein each bi-directional rectifier is constituted by a triac.

6. A circuit as set forth in claim 5, further including an R-C network connected across each triac to prevent excessively rapid voltage changes thereacross.

7. A circuit as set forth in claim 3, further including a current-limiting resistor interposed between said line and said bridge.

8. A circuit as set forth in claim 1, further including a synchronous rectifier interposed between said indicator and said metering electrodes, and means including an auxiliary coil disposed in said magnetic field to produce a control voltage for governing the operation of said synchronous rectifier.

9. A circuit as set forth in claim 1, wherein said indicator has a relatively slow response time in comparison to the polarity reversing rate.

* * * * *

UNITED STATES PATENT OFFICE
CERTIFICATE OF CORRECTION

Patent No. 3,783,686                    Dated January 8, 1974

Inventor(s) Rainer Hentschel

It is certified that error appears in the above-identified patent and that said Letters Patent are hereby corrected as shown below:

Column 1, line 48 "tansitory" should have read -- transitory --

Column 2, line 44 "havng" should have read -- having --

Column 3, line 9 "crate" should have read -- create -- line 17 "a" should have read -- an --

Column 4, line 25 after "voltage" add the words -- generated by the flowing medium and the error voltage --

Column 5, line 41 "singal" should have read -- signal --

Signed and sealed this 11th day of June 1974.

(SEAL)
Attest:

EDWARD M. FLETCHER, JR.
Attesting Officer

C. MARSHALL DANN
Commissioner of Patents